(12) United States Patent
Kaur et al.

(10) Patent No.: US 11,920,007 B2
(45) Date of Patent: Mar. 5, 2024

(54) PROCESS FOR PRODUCING ULTRAHIGH MOLECULAR WEIGHT POLYMER IN POWDER FORM

(71) Applicant: INDIAN OIL CORPORATION LIMITED, Maharashtra (IN)

(72) Inventors: Sukhdeep Kaur, Faridabad (IN); Gurmeet Singh, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

(*) Notice: Subject to any disclaimer, the term of this patent is extended or adjusted under 35 U.S.C. 154(b) by 232 days.

(21) Appl. No.: 17/356,296

(22) Filed: Jun. 23, 2021

(65) Prior Publication Data
US 2021/0395468 A1 Dec. 23, 2021

(30) Foreign Application Priority Data
Jun. 23, 2020 (IN) .............................. 202021026558

(51) Int. Cl.
*C08J 3/12* (2006.01)
*C08L 23/26* (2006.01)

(52) U.S. Cl.
CPC ............... *C08J 3/124* (2013.01); *C08L 23/26* (2013.01); *C08L 2023/44* (2013.01); *C08L 2207/068* (2013.01)

(58) Field of Classification Search
CPC ..................................................... C08J 3/124
See application file for complete search history.

(56) References Cited

U.S. PATENT DOCUMENTS

| 4,243,784 A * | 1/1981 | Akima .................. C08F 222/00 526/272 |
| 4,493,904 A * | 1/1985 | Mack ...................... C08F 10/00 502/122 |
| 5,449,732 A | 9/1995 | Smith et al. |
| 5,504,131 A | 4/1996 | Smith et al. |
| 5,504,132 A | 4/1996 | Smith et al. |
| 6,015,779 A * | 1/2000 | Eaton ................... C10M 107/10 526/125.1 |
| 6,114,271 A * | 9/2000 | Bilda ........................ B01J 31/38 526/908 |
| 8,110,150 B2 | 2/2012 | Eaton et al. |
| 10,094,399 B2 * | 10/2018 | Kaur ......................... F15D 1/06 |
| 2016/0108146 A1 * | 4/2016 | Bagui ...................... C07F 7/28 502/118 |

OTHER PUBLICATIONS

Koch Sure-Sol flyer (Year: 2000).*

* cited by examiner

*Primary Examiner* — Irina Krylova
(74) *Attorney, Agent, or Firm* — Maschoff Brennan

(57) ABSTRACT

The present invention relates to a process for producing ultrahigh molecular weight polymer in powder form which is highly efficient drag reducing polymer. The process consists of polymerizing using titanium halide-based catalyst, co-catalyst, optionally a solvent, and monomer to a polymerization reactor, having stirring device and inlet charging and discharge outlet. The resulting ultrahigh molecular weight drag reducing polymers is free flowing, having intrinsic viscosity >10 dL/g. The process reduces polymerization time, temperature, and achieves high conversion, i.e., >90%.

4 Claims, No Drawings

PROCESS FOR PRODUCING ULTRAHIGH MOLECULAR WEIGHT POLYMER IN POWDER FORM

FIELD OF THE INVENTION

The present invention relates to a process for producing ultrahigh molecular weight highly efficient drag reducing polymer in powder form. The process comprises of polymerizing monomer in a reactor in presence of catalyst system, to obtain ultra-high molecular weight polymer as free flowing powder.

BACKGROUND OF THE INVENTION

Production of ultrahigh molecular weight drag reducing polymer remains a major challenge in polymer industry. The reaction process for production of these polymers requires stringent conditions like longer polymerization time, lower polymerization temperature, specialized catalyst systems and sometime specialized equipment. For commercial production of these polymers, development of novel process is highly desirable.

The selection of typical reactor for production of such niche polymers depends upon many factors. One of the main among them is type of monomer and chain length. Usually, monomers with chain length $<C_4$ can be handled in CSTR dimensions. Beyond $C_4$ chain length, handling of the polymer becomes tricky due to the pendent chain length which makes it sticky and tacky. Also, as the molecular weight of the polymer increases, the inherent property of cohesiveness and viscosity increases which becomes difficult for normal dimension reactors.

Apart for the challenges faced for polymerization, the main challenge faced is retrieval of the drag reducing polymer for further processing. The extraction of the drag reducing polymer either from the reactor or any other media used in a reactor system is generally processing such reactor systems along with the drag reducing polymer. This can be understood such as that during the initiation of polymerization, the material is transferred into reactors which can be plastic bags, multi-layered for barrier properties, retained as reactor media till desired conversion is attained. Further the whole reactor along with drag reducing polymer is processed to make final slurry product.

U.S. Pat. No. 8,110,150 describes a polymerization reactor for preparing drag-reducing polymer where the reactor is having a reservoir and one heat exchanger plate in fluid communication with a coolant source, wherein each heat exchanger plate is placed on a lid. The exchanger plates can be readily disengaged from the drag-reducing polymer. The polymerization reactors permit large amounts of polymer to be formed in each reactor batch by bulk polymerization. Here bulk blocks of polymer are removed from the reactor.

U.S. Pat. Nos. 5,449,732, 5,504,131, and 5,504,132, describe plastic bags as the polymerization reactor i.e., plastic bags having barrier properties hence preventing passage of oxygen and water. These plastic bags have small size hence preventing the usage of any cooling system or addition of cooling additives during polymerization time. Here also, tubes form of polymer having plastic as outer covering is the final DRA polymer.

Prior arts teach that polymerization is carried out at low temperatures and for longer durations 15 days to achieve ultra-high molecular weight and high conversions. The drag reducing polymer thus obtained is either retrieved as hard block of polymer in bale form or long cylindrical form. The slurry preparation step involves granulation step, grinding step and homogenization. None of the above said prior arts and the available literature disclose or teach preparation of ultrahigh molecular weight drag reducing polymer within 24 hours as free flowing, with conversion >90%.

SUMMARY OF THE INVENTION

The present invention describes a process of producing ultrahigh molecular weight highly efficient drag reducing polymer in powder form, where the process consists of polymerizing monomer using catalyst system.

In one of the embodiments the present invention provides a process for preparing free flowing ultra-high molecular weight drag reducing polymer, the process comprising:
  a. adding titanium halide-based catalyst, co-catalyst, solvent and monomer to a polymerization reactor to obtain a mixture;
  b. maintaining the polymerization mixture at a temperature range of −10° C. to 30° C. for at least 12 hours for achieving conversion >90%;
  c. withdrawing drag reducing polymer having intrinsic viscosity >10 dL/g as free flowing powder.

In an embodiment the polymerization mixture of step (b) is kept at temperature in the range of −10° C. to 30° C. for about 12 hours to 24 hours.

In another embodiment, the present invention provides a process for preparing ultra-high molecular weight drag reducing polymer, the process comprising:
  a. adding a catalyst, co-catalyst, optionally a solvent and monomer to a polymerization reactor to obtain a polymerization mixture;
  b. polymerizing the monomer, under stirring, at a temperature in the range of −10° C. to 30° C. for at least 12 hours for forming the ultra-high molecular weight drag reducing polymer; and
  c. withdrawing the ultra-high molecular weight drag reducing polymer, having intrinsic viscosity >10 dL/g, from the polymerization reactor as free flowing particles/powder.

In an embodiment the polymerizing step (b) is carried for about 12 hours to 24 hours.

According to another embodiment, the present invention provides a process of producing free flowing ultrahigh molecular weight drag reducing polymer comprising:
  (1) introducing into a polymerization reactor equipped with stirring device and equipped with inlet charging and discharge outlet,
    (i) a catalyst system based on titanium halide, which is supported on magnesium chloride matrix with/without internal donor, or unsupported with/without internal donor, a solvent that is saturated or unsaturated hydrocarbon, and an organoaluminum compound; and
    (ii) alpha-olefins, $C_4$ and above, as monomers to obtain a polymerization mixture;
  (2) stirring the polymerization mixture continuously to achieve homogeneity;
  (3) polymerizing the monomers, by employing the feasible conditions necessary to achieve the conversion of at least 90% in the polymerization reactor;
  (4) polymerizing the monomers, by employing the feasible conditions necessary to achieve the polymer having intrinsic viscosity >10 dL/g in the polymerization reactor; and
  (5) withdrawing the drag reducing polymer from the polymerization reactor as free flowing powder.

In another preferred embodiment of the present invention, provides a process for preparing ultra-high molecular weight drag reducing polymer as free-flowing powder having intrinsic viscosity >10 dL/g, by polymerizing alpha-olefins with carbon chain having atleast four carbons as monomers, in a polymerization reactor equipped with stirring device, inlet charging and discharge outlet.

In another preferred embodiment of the present invention, the process comprising:
a) adding titanium halide based catalyst, supported on magnesium chloride matrix with/without internal donor, or unsupported with/without internal donor;
b) adding saturated or unsaturated hydrocarbon as solvent;
c) adding organo aluminum compound;
d) adding alpha-olefins, with carbon chain having at least four carbons, as monomers, into a polymerization reactor to obtain a polymerizing mixture.

wherein the polymerization mixture is under continuous stirring at a temperature range of −10° C. to 10° C. for at least 12 hours for achieving conversion of atleast 90%.

In another embodiment of the present invention, the polymerization is conducted in bulk under inert and oxygen free conditions.

In an embodiment of the present invention, polymerization reactor is equipped with stirring device and equipped with inlet charging and discharge outlet.

In another embodiment of the present invention, polymerization reactor is an extruder/kneader reactor.

In another embodiment of the present invention, monomer is selected from the group comprising of $C_4$ and above monomers, wherein the monomer is selected from 1-butene, 1-hexene, 1-octene, 1-decene, 1-dodecene and combination thereof.

In another embodiment of the present invention, the solvent can be saturated or unsaturated hydrocarbon not limiting to hexane, benzene, decane, chlorobenzene, toluene, xylene, and the like.

In another embodiment of the present invention, ultrahigh molecular weight drag reducing polymer has intrinsic viscosity>10dL/g. In a preferred embodiment, the ultrahigh molecular weight drag reducing polymer obtained by the process of the present invention has intrinsic viscosity in the range of 10 dl/g to 35 dl/g.

In another embodiment of the present invention, polymerization reactor can be used under pressurized condition and/or can have positive pressure.

In a preferred embodiment, polymerization reactor pressure is in the range of 0.5 to 1 bar.

In another embodiment of the present invention, the co-catalyst is organoaluminum.

In another embodiment of the present invention, mole ratio of aluminum to titanium is in range of about 1:1 to about 250:1.

In another embodiment of the present invention, co-catalyst and the catalyst are contacted for about 1 to 240 min.

In a preferred embodiment, co-catalyst and the catalyst are contacted for about 1 to 180 min.

OBJECTIVES OF THE PRESENT INVENTION

It is the main objective of the invention to provide a process for producing easy dischargeable ultrahigh molecular weight polymer which is highly efficient drag reducing agent (DRA) polymer. It is the further objective of the present invention to provide reduction in polymerization time, workable polymerizing temperature, and high conversions.

Further objective of the invention is to provide a process for producing easy dischargeable ultra-high molecular weight drag reducing polymer to be used in DRA applications.

Further the objective of the invention is that the process uses titanium halide-based catalyst system.

DETAILED DESCRIPTION OF THE INVENTION

The present invention provides a process of producing ultrahigh molecular weight highly efficient DRA polymer in powder form.

According to the present invention a process of producing free flowing ultrahigh molecular weight drag reducing polymer is provided. The process comprises the steps of:
1) introducing into a polymerization reactor equipped with stirring device and equipped with inlet charging and discharge outlet,
   (i) a catalyst system based on titanium halide, which is supported on magnesium chloride matrix with/without internal donor, or unsupported with/without internal donor, a solvent that is saturated or unsaturated hydrocarbon, and an organoaluminum compound and
   (ii) alpha-olefins, $C_4$ and above, as monomers as it is desirable that the polymer produced is non-crystalline to obtain a polymerization mixture.
2) stirring the polymerization mixture continuously to achieve homogeneity;
3) polymerizing the monomer, by employing the feasible conditions necessary to achieve the conversion of atleast 90% in the polymerization reactor;
4) polymerizing the monomer, by employing the feasible conditions necessary to achieve the drag reducing polymer having intrinsic viscosity >10 dL/g in the polymerization reactor; and
5) withdrawing the drag reducing polymer from the polymerization reactor as free flowing powder.

In a preferred embodiment, the saturated or unsaturated hydrocarbon in the above process is selected from hexane, benzene, decane, chlorobenzene, toluene, xylene, or the like. In another preferred embodiment, the organoaluminum compound in the above process consists of alkylaluminium halides preferably diethylaluminum chloride or triisobutylaluminum chloride or mixture thereof.

In a preferred embodiment, the feasible conditions necessary to achieve the conversion of at least 90% in the polymerization reactor, includes the reaction temperature, catalyst concentration, and monomer concentrations.

In a preferred embodiment, the feasible conditions necessary to achieve the polymer having intrinsic viscosity >10 dL/g in the polymerization reactor, includes—controlling chain termination reactions, efficient homogenous mixing, and residence time. In a further preferred embodiment, the residence time is in the range of 12 to 24 hours.

In an embodiment, the vital aspect to be considered is the conversion, the flow characteristics, and the shear, which enable the process to contribute for obtaining free flowing characteristics of the polymer hence solving the technical problem posed in conventional processes. The process of the present invention provides economical advantage in industrial production.

In an embodiment, it is desirable that the polymerization reactor is able to handle and implement the vital aspects of the process. It is highly desirable to obtain free flowing ultrahigh molecular weight drag reducing polymer.

In another embodiment of the present invention, the polymerization is carried out in a solvent wherein the mass of solvent is about 1% to about 10% of the total mass of the monomer and the solvent. In another embodiment, the polymerization step is solvent free.

In another embodiment of the present invention, it is highly desirable to carry out polymerization until conversions >90% are achieved.

In an embodiment, the conversions are about 90% to 100%. The flow characteristics of the polymerization medium is indeed the reflection of the viscosity of the medium which essentially consist of polymer, monomer and optionally, solvent. The viscosity of the polymerization medium can reach high values.

In an embodiment, the inherent viscosity of the polymer is preferably about 10 dl/g to 35 dl/g. The inherent viscosity is determined according to the method described below:

Intrinsic Viscosity is used as an indirect method of measurement of molecular weight because the extremely high molecular weight of these materials makes the normal methods of determining molecular weight unreliable.

In another embodiment of the present invention, inherent viscosity is determined using a Cannon Ubbelohde Four bulb shear dilution viscometer. Concentrations of 0.05-gram polymer/per 100 milliliters THF solvent is used at 25° C. Inherent viscosities are calculated for each of the last three bulbs (the high shear rate bulb is discounted because of excessive shear thinning) and plotted as a function of average shear rate. The plot is then used to obtain an inherent viscosity at a shear rate of 300 seconds$^{-1}$.

For every polymerization to proceed effectively, the homogenous mixing of the medium is very important. In order to accomplish this, the stirring inside the reactor ensures the homogenous mixing of the medium at any viscosity value. This is crucial in order to synthesize persistent quality of the drag reducing polymer. In addition to this, the polymerization reactor must be suitable to handle such type of polymerization conditions. The polymerization conditions include reaction medium viscosities, residence time, flow characteristics of the medium, homogeneity, and shear.

The polymerization reactor is of certain configuration such as it has a stirrer/stirring device and is equipped with inlet charging and discharge outlet. The type of reactor can be vessel or tank type which can be either horizontal or vertical. Depending upon the dimensions and the type of reactor, the stirring device along with the inlet charging and discharge outlet are suitably placed.

An extruder/kneader can also be used as the polymerization reactor. The polymerization reactor can be used under pressurized condition and/or can have positive pressure.

In another embodiment, a distillation unit along with the polymerization reactor can be used to remove solvent or residual monomer.

In an embodiment, catalyst system based on titanium halide, which can be supported on magnesium chloride matrix without internal donor, or unsupported with/without internal donor is used. The catalyst system may be prepared according to the process described in US 10,094,399.

In an embodiment, the solvent can be saturated or unsaturated hydrocarbon, and the non-limiting examples of such solvent is hexane, benzene, decane, chlorobenzene, toluene, xylene, and the like.

In an embodiment, the organoaluminum compounds include, but not limiting to, alkylaluminums such as trialkylaluminum such as triethylaluminum, triisopropylaluminum, trii sobutyl aluminum, tri-n-butyl aluminum, tri-n-hexyl aluminum, tri-n-octyl aluminum; trialkenylaluminums such as triisoprenyl aluminum; dialkylaluminum halides such as di ethyl aluminum chloride, dibutylaluminum chloride, dii sobutyl aluminum chloride and diethyl aluminum bromide; alkylaluminum sesquihalides such as ethylaluminum sesquichloride, butylaluminum sesquichloride and ethylaluminum sesquibromide; dialkylaluminum hydrides such as diethylaluminum hydride and dibutylaluminum hydride; partially hydrogenated alkylaluminum such as ethylaluminum dihydride and propylaluminum dihydride and aluminoxane such as methylaluminoxane, isobutylaluminoxane, tetraethylaluminoxane and tetraisobutylaluminoxane; diethylaluminum ethoxide and mixtures thereof.

The mole ratio of aluminum to titanium, is from about 1:1 to about 250:1. In one of the preferred embodiments the mole ratio of aluminum to titanium, in accordance with the present invention, is from about 1.5:1 to about 100:1.

To achieve intrinsic viscosity of the resultant polymer >10 dL/g, organoaluminums having $C_4$ and above are desired.

In an embodiment, the co-catalyst and the catalyst are contacted, in accordance with the present invention, from about 1 to 240 min. More preferably, from about 1 to 180 min.

In the preferred embodiment, the polymerization can be carried out using $C_2$ and higher alpha olefins. Since the polymer produced may be non-crystalline, $C_4$ and higher monomers and its mixtures can be used.

In order to attain higher molecular weight polymers, it is preferred to control the chain terminations and/or chain transferring reactions.

A process of producing free flowing ultrahigh molecular weight drag reducing polymer is described in the present invention.

The first aspect of the process according to the present invention is related to the addition of the components. In an embodiment, all the components of the initial reaction medium, the catalyst along with cocatalyst, solvent and monomer, are introduced together into the polymerization reactor.

According to another embodiment, all the components of the initial reaction medium are introduced individually directly into the polymerization reactor. According to another embodiment, at least two components of the initial reaction medium are introduced as mixture into the polymerization reactor. The mixing of the components can be carried out by various means known in the art not limiting to static, dynamic or ultrasonic mixers. The mixture can be temperature-conditioned before introducing into the polymerization reactor. In an embodiment, the two components are the catalyst and the cocatalyst.

It is mandatory to perform the pre-polymerization and the polymerization step under inert conditions as the catalyst and the co-catalyst is moisture and oxygen sensitive. The second aspect of the process according to the present invention is attaining homogenous solution by the inherent nature of the stirring device. In an embodiment, the stirring of the polymerization medium is such so as to achieve homogeneity. In another embodiment, the stirring should not generate shearing effect.

In an embodiment, the stirring in the polymerization reactor can be continuous or can be varied.

In an embodiment, the stirring device can dissipate heat of the polymerization by cooling the stirring device. The inventors were surprised to find that the stirring during the polymerization can be stopped for some duration without affecting the quality of the polymer.

The third aspect of the process according to the present invention is polymerizing the monomer, by employing the feasible conditions necessary to achieve the conversion of at least 90% in the polymerization reactor.

In an embodiment, the average residence time of the reaction (polymerization) is at least 12 hours. In a preferred embodiment, the average residence time of the reaction (polymerization) is about 24 hours.

For a person skilled in this art, the conversions below 90% and higher residence time are not desirable. The economics of the process and the manufacturing cost will be then compromised. To achieve the conversion of at least 90%, the person skilled in this art utilizes the conditions or means that is required which can be in multiple combinations, this includes, the reaction temperature, catalyst concentration, and monomer concentrations. In a preferred embodiment of the present invention, the reaction temperature is in the range of −10° C. to 30° C.

The fourth aspect of the process according to the present invention is polymerizing the monomer, by employing the feasible conditions necessary to achieve the polymer having intrinsic viscosity >10 dL/g in the polymerization reactor. While the temperature of polymerization can be maintained in the range of −50° C. to 30° C., it has been surprisingly found by the inventors of the present invention that, the present process achieves conversion of at least 90% in an average residence time of about 24 hours or less, if the temperature of polymerization is maintained in the range of −10° C. to 30° C. Due to the selective residence time and temperature of polymerization, not only at least 90% conversion is achieved, but also the drag reducing polymer formed is such that, it can be withdrawn as a free flowing powder.

The fifth aspect of the process according to the present invention is withdrawing the drag reducing polymer from the polymerization reactor as free flowing powder/particles. In an embodiment, the free-flowing polymer is obtained due to the churning action of the stirring device, high conversions attained due to control of chain termination reactions, and intrinsic viscosity.

In another embodiment, the free-flowing drag reducing polymer is withdrawn from the discharge outlet.

In another embodiment, the free-flowing drag reducing polymer is ultra-high molecular weight polymer.

In another embodiment, the free-flowing drag reducing polymer is ultra-high molecular weight polymer which is highly efficient DRA polymer.

In another embodiment, the polymerization reactor can be reused for subsequent batch.

For person skilled in the art, the final product to be used as drag reducing agent (DRA) is in slurry form. Conventionally, the whole process of preparing DRA slurry involves polymerization, granulation, grinding, and slurry preparation.

Conventionally, in polymerization, the time and temperature of polymerization is controlled in such a manner that the final neat polymer is of ultra-high molecular weight. This polymer is obtained as bale or in block form depending upon the shape of the reactor. This is further granulated to specific size along with anti-agglomerating agent in temperature-controlled conditions. The granulated polymer is further grinded under cryogenic conditions in presence of anti-agglomerating agent to form powder form and this powder is converted into slurry along with addition of diluents specific on the end use.

As compared to the above conventional process, the process of the present invention provides the ultra-high molecular weight drag reducing polymer as free-flowing easy dischargeable polymer, which can be directed to sieving unit. This sieving unit will separate the polymer particles into desirable size. In an embodiment, an anti-agglomerating agent is not required to be added into the free-flowing drag reducing polymer for further processing. In another embodiment, the sieved free flowing Drag Reducing polymer is >1 mm.

In another embodiment, the percentage of the drag reducing polymer sieved having size <1 mm is between 1 to 10%.

In another embodiment, the sieving is done under ambient temperature.

In an embodiment, the sieved free flowing drag reducing polymer is further grinded under cryo or ambient conditions to form particles of size between 50 micron to 850 micron in presence of anti-agglomerating agent.

In another embodiment, anti-agglomerating agents include, but not limited to alumina, clay, silica, stearates of calcium and/or magnesium, talc, streamside's, petroleum, or natural occurring waxes. The amount of these anti-agglomerating agents can be from 10 to 45 weight % of polymer. In an embodiment, dispersant effective for making slurry and acting as thickening or dispersing or suspending agents include, but not limited to, water, alcohols, alcohol ethoxylates, glycols, ketones, refinery distillates, refined vegetable oils and the likes. These dispersants can be used in mixtures also.

The term "active polymer" as used herein refers to neat polymer without any anti-agglomerating agent.

The drag reducing agent (DRA) is a combination of active polymer, anti-agglomerating agent and dispersant.

In an embodiment, the amount of active polymer in the DRA slurry is preferably from 10 to 35 weight % of the total slurry. In another embodiment, the amount of anti-agglomerating agents is preferably from 10 to 45 wt % of active polymer. In another embodiment, the amount of dispersant for making slurry is preferably from 50 to 90 wt % of the total slurry.

EXAMPLES

The following examples are included herein for illustrative purposes only. Those skilled in the art will appreciate that many modifications may be made in the invention without changing the essence of invention.

All monomers and solvents were used as obtained and contained moisture less than 20 ppm. All chemicals were handled under nitrogen atmosphere and used as obtained. Before polymerization, the polymerization reactor was heated to 120° C. for 2 h under nitrogen flow and cooled accordingly.

Example I Show the Process of Producing Free Flowing Ultrahigh Molecular Weight Polymer in Powder Form The process of polymerization was carried out in a kneader reactor having single screw configuration of 7 L capacity equipped with gear pump. The catalyst and co-catalyst were handled under nitrogen conditions. The mole ratios of catalyst, co-catalyst and monomer were according to U.S. Pat. No. 10,094,399 written by the Applicant. The monomer used was 1-decene. This polymerization mixture (mixture of catalyst, co-catalyst, and monomer) was prepared under nitrogen atmosphere and transferred into the kneader reactor maintained at 10° C., through inlet charging port situated on the reactor. As soon as the mixture was in the reactor, the stirring was started to maintain the homogeneity of the solution. The reactor was kept under nitrogen pressure regulated to 0.5 to 1.0 bar. The stirrer speed was regulated depending upon the viscosity of the mixture. The average residence time of the reaction was 24 h. As the polymerization proceeds to near completion, the drag reducing polymer starts to change over into powder form. The screw stirrer is able to be used as discharge outlet pushing the polymer out of the reactor. The conversion after this process was ~90% with polymer having intrinsic viscosity of 23 dL/g.

Example II Shows the Process of Producing Free Flowing Ultrahigh Molecular Weight Polymer in Powder Form The process of polymerization was same as Example I with only difference that the monomer used was 1-dodecene/1-hexene in 80/20 by volume. The conversion after this process was ~93% with polymer having intrinsic viscosity of 21 dL/g.

Example III Shows the Process of Producing Free Flowing Ultrahigh Molecular Weight Polymer in Powder Form The process of polymerization was same as Example I with only difference that the monomer used was 1-decene/1-octene in 70/30 by volume. The conversion after this process was ~92% with polymer having intrinsic viscosity of 23 dL/g.

Example IV Shows the Process of Producing Stable Slurry to Be Used as Drag Reducing Agent in Transportation of Product in Pipeline The retrieved polymer powder as in Example I was sieved through 1 mm sieve and grinded to obtain particle size of <500 micron along with anti-agglomerating agent (~10 wt %). A slurry (Slurry-A) was prepared using 25 wt % active polymer (grinded) and 60 wt % of the alcohol/glycol mixture (1- hexanol/ethylene glycol monomethyl ether: 60/30 v/v). For the effective mixing of the contents, this slurry was homogenized using IKA T18 digital Ultra Turrax. The resulting DRA slurry was found to be stable i.e., no phase separation was observed, after keeping for several weeks.

Example V Shows the Process of Producing Stable Slurry to Be Used as Drag Reducing Agent in Transportation of Product in Pipeline Slurry-B was prepared using 25 wt % active polymers (grinded) and 60 wt % of the soyabean oil and similarly homogenized. The resulting DRA slurry was found to be stable i.e., no phase separation was observed, after keeping for several weeks.

Example VI Showing the Process of Producing Stable Slurry to Be Used as Drag Reducing Agent in Transportation of Crude in Pipeline Slurry-C was prepared using 30 wt % active polymers (grinded), 0.1 weight percent of zantham gum and 50/50 mixture of water and isopropyl alcohol and similarly homogenized. The resulting DRA slurry was found to be stable i.e., no phase separation was observed, after keeping for several weeks.

Comparative Example I

The process of polymerization was same as Example I with only difference that the polymerization temperature was −15° C. After the conditions followed in the invention, the polymer obtained was sticky in nature with the conversion of ~54% with polymer having intrinsic viscosity of 7 dL/g.

Comparative Example II

The process of polymerization was same as Example I with only difference that the polymerization temperature was 40° C. After the conditions followed in the invention, the polymer obtained was rubbery in nature with the conversion of ~59% with polymer having intrinsic viscosity of 8.4 dL/g.

We claim:
1. A process for preparing an ultra-high molecular weight drag reducing polymer, the process comprising:
   a. adding a titanium halide based catalyst, wherein the titanium halide based catalyst is supported on a magnesium chloride matrix with/without an internal donor, or unsupported with/without an internal donor;
   b. adding a co-catalyst, wherein the co-catalyst is an organoaluminum compound; and
   c. preparing a polymerization mixture comprising the titanium halide based catalyst, the co-catalyst and monomers, wherein the monomers are alpha-olefins with carbon chains having at least four carbons in a polymerization reactor;
   d. continuously stirring the polymerization mixture for a residence time ranging from 12 to 24 hours at a temperature of approximately 10° C. and regulating the stirring depending upon a viscosity of the polymerization mixture to obtain the ultra-high molecular weight drag reducing polymer as a free-flowing powder having an intrinsic viscosity a range of 21 dL/g to 35 dL/g and achieving conversion of at least 90%;
   wherein the polymerization is a bulk polymerization and is carried under inert and oxygen free conditions, at a pressure of 0.5 bar.
2. The process as claimed in claim 1, wherein the organoaluminum compound is selected from the group consisting of
   an alkylaluminum, a trialkenylaluminum, a dialkylaluminum halide, an alkylaluminum sesquihalide, a dialkylaluminum hydride, a partially hydrogenated alkylaluminum and aluminoxane,
   wherein the alkylaluminum is selected from the group consisting of trialkylaluminum, triethyl aluminum, triisopropyl aluminum, triisobutyl aluminum, tri-n-butyl aluminum, tri-n-hexyl aluminum and tri-n-octyl aluminum;
   the trialkenylaluminum is selected from the group consisting of triisoprenyl aluminum;
   the dialkylaluminum halide is selected from the group consisting of diethyl aluminum chloride, dibutylaluminum chloride, diisobutyl aluminum chloride and diethyl aluminum bromide;

the alkylaluminum sesquihalide is selected from the group consisting of ethylaluminum sesquichloride, butylaluminum sesquichloride and ethylaluminum sesquibromide;

the dialkylaluminum hydride is selected from the group consisting of diethylaluminum hydride and dibutylaluminum hydride;

the partially hydrogenated alkylaluminum is selected from the group consisting of ethylaluminum dihydride and propylaluminum dihydride; and the aluminoxane is selected from the group consisting of methylaluminoxane, isobutylaluminoxane, tetraethylaluminoxane, tetraisobutylaluminoxane and diethylaluminum ethoxide, and mixtures thereof.

3. The process as claimed in claim 1, wherein the monomer is selected from the group consisting of 1-butene, 1-hexene, 1-octene, 1-decene, 1-dodecene and combinations thereof.

4. The process as claimed in claim 1, wherein the polymerization reactor is an extruder or a kneader.

\* \* \* \* \*